United States Patent [19]

Tomoshige et al.

[11] Patent Number: 5,519,079
[45] Date of Patent: May 21, 1996

[54] POLYEPICHLOROHYDRIN, 2,3-DIMERCAPTO(PYRAZINE OR QUINOXALINE) AND HYDROTALCITE

[75] Inventors: Yoshihiro Tomoshige, Masuda; Yoshikazu Nishi, Amagasaki; Hidekazu Tanaka, Amagasaki; Kohji Ohnuki, Amagasaki; Yasuo Matoba, Nishinomiya, all of Japan

[73] Assignee: Daiso Co., Ltd., Osaka, Japan

[21] Appl. No.: 352,884

[22] Filed: Dec. 9, 1994

[30] Foreign Application Priority Data

Dec. 9, 1993 [JP] Japan .................................. 5-308836
Apr. 19, 1994 [JP] Japan .................................. 6-080176

[51] Int. Cl.$^6$ .................................................. C08K 03/26
[52] U.S. Cl. .................................... 524/436; 524/612
[58] Field of Search ........................ 525/403; 524/436, 524/612

[56] References Cited

U.S. PATENT DOCUMENTS

| | | | |
|---|---|---|---|
| 4,357,446 | 11/1982 | Matoba | 525/281 |
| 4,511,698 | 4/1985 | Matoba et al. | 525/187 |
| 4,558,102 | 12/1985 | Miyata | 524/424 |
| 4,675,356 | 6/1987 | Miyata | 524/436 |
| 4,786,665 | 11/1988 | Nagkagawa et al. | 524/424 |
| 5,250,279 | 10/1993 | Preston et al. | 423/432 |
| 5,344,861 | 9/1994 | Nakamura et al. | 524/433 |

FOREIGN PATENT DOCUMENTS

| | | |
|---|---|---|
| 56-122865 | 9/1981 | Japan . |
| 56-122866 | 9/1981 | Japan . |
| 57-151652 | 9/1982 | Japan . |
| 58-111843 | 7/1983 | Japan . |
| 59-1565 | 1/1984 | Japan . |
| 59-227947 | 12/1984 | Japan . |
| 59-227946 | 12/1984 | Japan . |
| 62-7755 | 1/1987 | Japan . |
| 62-7754 | 1/1987 | Japan . |

OTHER PUBLICATIONS

Kyowa Chemical Industry Co., Ltd., Jul. 1981, pp. 1–4.
"Non Toxic Water-Resistant Acid Acceptor", KW & DHT, Kyowa Chemical Industry Co., Ltd., May 1990, pp. 1–9.

*Primary Examiner*—Robert E. Sellers
*Attorney, Agent, or Firm*—Foley & Lardner

[57] ABSTRACT

A vulcanizable composition which contains (a) 100 parts by weight of an epichlorohydrin polymer;
(b) 0.1 to 10 parts by weight of a 2,3-dimercaptopyrazine derivative or a 2,3-dimercaptoquinoxaline derivative; and
(c) 1 to 10 parts by weight of a hydrotalcite compound, has the high vulcanization rate and the excellent long time storage stability.

17 Claims, 3 Drawing Sheets

POLYEPICHLOROHYDRIN, 2,3-DIMERCAPTO(PYRAZINE OR QUINOXALINE) AND HYDROTALCITE

FIELD OF THE INVENTION

The present invention relates to a curable composition based on an epichlorohydrin polymer having the excellent vulcanization property and storage stability.

RELATED ART

It is already proposed by Daiso Co. Ltd. that a composition comprising an epichlorohydrin polymer can be effectively vulcanized by 2,3-dimercaptopyrazine, 2,3-dimercaptoquinoxaline or derivatives thereof in the presence of a metal compound acting as an acid acceptor [cf. Japanese Patent Kokai Publication Nos. 122865/1981, 122866/1981, 227946/1984 and 227947/1984 (Japanese Patent Kokai Publication Nos. 122865/1981 and 122866/1981 correspond to U.S. Pat. No. 4,357,446)]. However, these vulcanizable compositions have an increase of viscosity because of vulcanization during the storage of the compositions so that it is difficult to shape the compositions. These compositions have poor storage stability, and the improvement of the storage stability is desired.

SUMMARY OF THE INVENTION

An object of the present invention is to provide a vulcanizable composition based on an epichlorohydrin polymer, which has a high vulcanization rate and an excellent storage stability for a long time.

The present inventors intensively made various studies on a composition comprising an epichlorohydrin polymer and a 2,3-dimercaptopyrazine or 2,3-dimercaptoquinoxaline derivative vulcanizing agent, then found that the above object is achieved by incorporating a hydrotalcite compound in the composition and completed the present invention.

The present invention provides a vulcanizable composition comprising (a) 100 parts by weight of an epichlorohydrin polymer;

(b) 0.1 to 10 parts by weight of a 2,3-dimercaptopyrazine derivative of the formula:

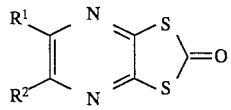

(I)

or, a 2,3-dimercaptoquinoxaline derivative of the formula:

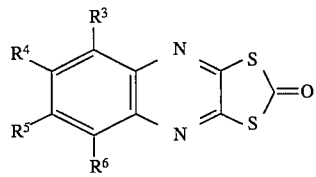

(II)

wherein $R^1$, $R^2$, $R^3$, $R^4$, $R^5$ and $R^6$ are the same or different, each is a hydrogen atom or an alkyl group containing 1 to 4 carbon atoms; and (c) 1 to 10 parts by weight of a hydrotalcite compound.

DETAILED DESCRIPTION OF THE INVENTION

Figure 1:
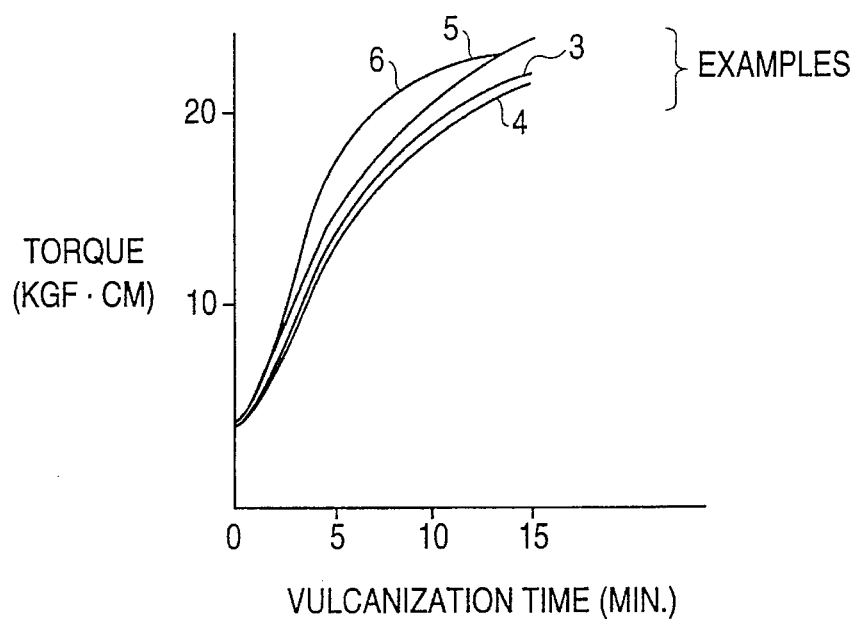
FIG. 1 shows vulcanization curves of compositions of Examples 3–6 immediately after mixing the ingredients.

The epichlorohydrin polymer (a) means a homopolymer of epichlorohydrin or a copolymer of epichlorohydrin with another epoxide such as ethylene oxide, propylene oxide or allyl glycidyl ether. Specific examples of the epichlorohydrin copolymer are an epichlorohydrin/ethylene oxide copolymer, an epichlorohydrin/propylene oxide copolymer, an epichlorohydrin/allyl glycidyl ether copolymer, an epichlorohydrin/ethylene oxide/allyl glycidyl ether three-component copolymer, an epichlorohydrin/propylene oxide/allyl glycidyl ether three-component copolymer, an epichlorohydrin/ethylene oxide/propylene oxide/allyl glycidyl ether four-component copolymer. Preferably, the copolymer contains at least 10% by mol of an epichlorohydrin component for the purpose of keeping a practical vulcanization rate. The epichlorohydrin polymer preferably has a usually used Mooney viscosity $ML_{1+4}$ (100° C.) of 30 to 150.

Specific examples of the 2,3-dimercaptopyrazine derivative of the formula (I) which is component (b) are pyrazine-2,3-dithiocarbonate, 5-ethylpyrazine-2,3-dithiocarbonate, 5,6-dimethylpyrazine- 2,3-dithiocarbonate and 5-n-butylpyrazine-2,3-dithiocarbonate. It is particularly preferable to use pyrazine-2,3-dithiocarbonate and/or 5-ethylpyrazine-2,3-dithiocarbonate.

Specific examples of the 2,3-dimercaptoquinoxaline derivative of the formula (II) which is component (b) are quinoxaline- 2,3-dithiocarbonate, 6-methylquinoxaline-2,3-dithiocarbonate, 6-isopropylquinoxaline- 2,3-dithiocarbonate and 5,8-dimethylquinoxaline- 2,3-dithiocarbonate. It is particularly preferable to use quinoxaline- 2,3-dithiocarbonate and/or 6-methylquinoxaline-2,3-dithiocarbonate.

The amount of the component (b) is from 0.1 to 10 parts by weight, preferably from 0.5 to 5 parts by weight per 100 parts by weight of the epichlorohydrin polymer (a). When the amount is smaller than this range, it is difficult to have the excellent vulcanization rate which is one of effects of the present invention. When the amount is larger than this range, the composition gives so stiff vulcanized material that the properties usually expected in the vulcanized material of the epichlorohydrin polymer cannot be obtained.

The hydrotalcite compound (c) preferably has the formula:

(III)

wherein x is from 1 to 10, y is from 1 to 5, and w is a real number. The value of w is usually at least 0, for example, from 0 to 20. Specific examples of the compound (c) are $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, and the like.

The amount of the hydrotalcite compound (c) is from 1 to 10 parts by weight, preferably from 2 to 8 parts by weight, per 100 parts by weight of the epichlorohydrin polymer (a). When the amount is smaller than this range, it is difficult to have both of the high vulcanization rate and the excellent storage stability which are effects of the present invention. When the amount is larger than this range, the effects cannot be significantly improved.

The hydrotalcite compound (c) is known as an acid acceptor which gives a halogen-containing elastomer having the good water resistance (cf. Japanese Patent Kokai Publication No. 151652/1982). It is also known that the incorporation of the hydrotalcite compound improves the thermal resistance when a chlorinated polyethylene is vulcanized by an organic peroxide and the like (cf. Japanese Patent Kokai Publication Nos. 7754/1987 and 7755/1987). However, none of these Publications discloses that the combination of hydrotalcite compound with the specified vulcanizing agent of 2,3-dimercaptopyrazine or 2,3-dimercaptoquinoxaline derivative improves the storage stability of the curable epichlorohydrin polymer composition.

The composition of the present invention may contain a metal compound which is an acid acceptor in view of the adjustment of vulcanization rate and the thermal stability of vulcanized material. The metal compound includes an oxide, hydroxide, carbonate salt, carboxylate salt, silicate salt, borate salt and phosphite salt of a metal of Group II of the Periodic Table, preferably Mg, Ba, Ca and Zn; an oxide, basic carbonate salt, basic carboxylate salt, basic phosphite salt, basic sulfite salt, tribasic sulfate salt of a metal of Group IV A of the Periodic Table, preferably Sn and Pb; and the like. Specific examples of the metal compound are magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc oxide, tin oxide, litharge, red lead, white lead, dibasic lead phthalate, dibasic lead carbonate, tin stearate, basic lead phosphite, basic tin phosphite, basic lead sulfite, tribasic lead sulfate and the like. The amount of the metal compound is from 0 to 20 parts by weight, for example, form 0.1 to 10 parts by weight, per 100 parts by weight of the epichlorohydrin polymer (a).

The composition according to the present invention may contains various additive used in the art, for example, an age resistor, a filler, a reinforcing agent, a plasticizer, a processing aid, a pigment, a flame retardant and the like.

The composition may contain a vulcanization accerelator or a vulcanization retarder for the purpose of adjusting the vulcanization rate. Specific examples of the vulcanization accerelator are sulfur, thiuram sulfides, morpholine polysulfides, amines, weak acid salts of amine, basic silica, quaternary ammonium salts, quaternary phosphonium salts and the like. Specific examples of the vulcanization retarder are N-cyclohexylthiophthalimide and the like. The amount of the vulcanization accerelator or vulcanization retarder is usually from 0 to 10 parts by weight, for example from 0.1 to 5 parts by weight, per 100 parts by weight of the epichlorohydrin polymer (a).

The preparation of the composition according to the present invention can use an arbitrary means used in the polymer processing, for example, a mixing roll, a Banbury mixer, various kneaders and the like. The composition according to the present invention can be converted to a vulcanized material usually by heating the composition to 100°–200° C. The vulcanization time depends on the vulcanization temperature and is usually from 0.5 to 300 minutes. The vulcanization can be performed by any desired methods such as press-shaping in a mold, an injection molding, and a thermoforming using a steam can, an air bath, an infrared ray or a microwave.

PREFERRED EMBODIMENT OF THE INVENTION

The present invention will be illustrated by the following Examples.

Examples 1 to 6 and Comparative Examples 1 to 7

Figure 2:
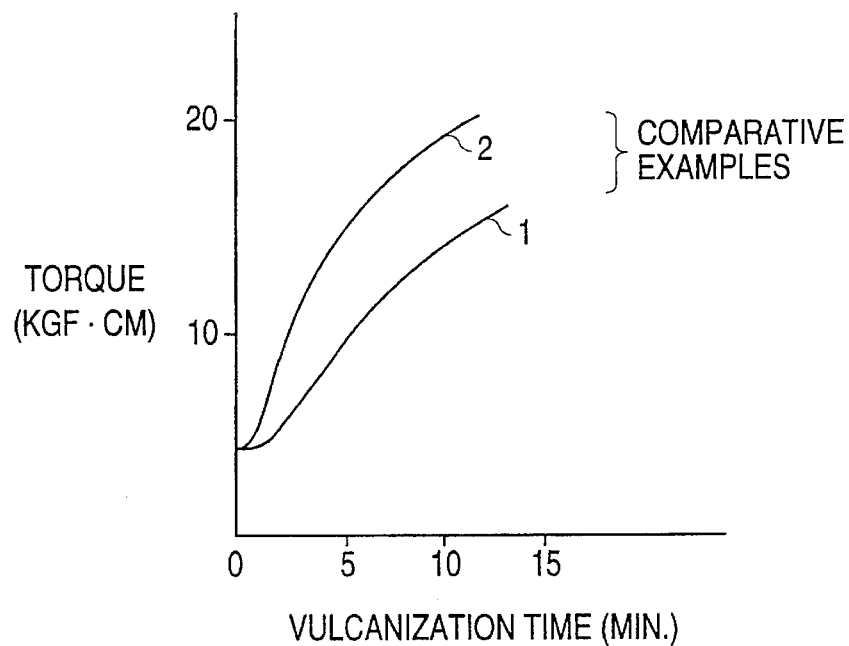
FIG. 2 shows vulcanization curves of compositions of Comparative Examples 1 and 2 immediately after mixing the ingredients.
Figure 3:
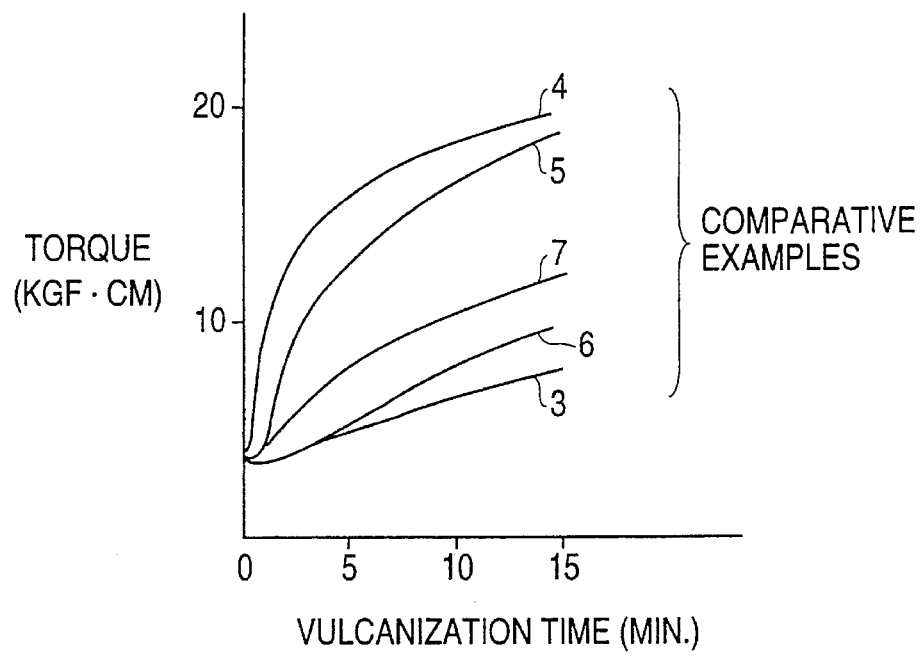
FIG. 3 shows vulcanization curves of compositions of Comparative Examples 3–7 immediately after mixing the ingredients.

The ingredients shown in Table 1 were kneaded in an open roll mill at 60° to 70° C. The storage stability of the composition is shown in Table 2. A composition sheet was placed in a mold immediately after mixing the ingredients, and then molded under pressure at 170° C. and 80 kg/cm² for 15 minutes. The vulcanizate obtained was tested for the various properties. The results are shown in Table 3. The vulcanization curves of the compositions obtained in Examples 3–6 and Comparative Examples 1–7 were determined immediately after mixing the ingredients by the use of JSR type III curelastometer at an angle of amplitude of 3° and a temperature of 170° C. The results are shown in FIGS. 1–3.

TABLE 1

| Ingredients | Example No. | | | | | |
|---|---|---|---|---|---|---|
| (parts by weight) | 1 | 2 | 3 | 4 | 5 | 6 |
| Epichlorohydrin homopolymer *1) | 100 | | | | | |
| ECH-EO-AGE copolymer *2) | | 100 | | | | |
| ECH-EO copolymer *3) | | | 100 | 100 | 100 | 100 |
| N-550 carbon black | 40 | 40 | 40 | 40 | 40 | 20 |
| White carbon *4) | | | | | | 20 |
| Sorbitan monostearate (lubricant) | 2 | 2 | 2 | 2 | 2 | 2 |
| Ni dibutyl dithiocarbamate (age resistor) | 1 | 1 | 1 | 1 | 1 | 1 |
| Hydrotalcite 1 *5) | | | 3 | 3 | 7 | 5 |
| Hydrotalcite 2 *6) | 3 | | | | | |
| Hydrotalcite 3 *7) | | 3 | | | | |
| Slaked lime | | | | | 3 | 3 |
| Magnesia | | | | | | |
| Mixture (1:2) of DBU *8) and phenol resin (accerelator) | 1 | 1 | 1 | 1 | 1 | |
| N-Cyclohexylthiophthalimide (retarder) | 0.5 | 0.5 | 0.5 | 0.5 | 0.5 | 0.5 |
| Pyrazine-2,3-dithiocarbonate | 3 | 3 | | | | |

TABLE 1-continued

| Ingredients | | | | | |
|---|---|---|---|---|---|
| (vulcanizing agent) | | | | | |
| 5-Ethylpyrazine-2,3-dithiocarbonate (vulcanizing agent) | 1.5 | 1.5 | 1.5 | 1.5 | |
| Trithiocyanuric acid (vulcanizing agent) | | | | | |

| Ingredients | Comparative Example No. | | | | | | |
|---|---|---|---|---|---|---|---|
| (parts by weight) | 1 | 2 | 3 | 4 | 5 | 6 | 7 |
| Epichlorohydrin homopolymer *1) | | | | | | | |
| ECH-EO-AGE copolymer *2) | | | | | | | |
| ECH-EO copolymer *3) | 100 | 100 | 100 | 100 | 100 | 100 | 100 |
| N-550 carbon black | 40 | 20 | 40 | 40 | 40 | 40 | 40 |
| White carbon *4) | | 20 | | | | | |
| Sorbitan monostearate (lubricant) | 2 | 2 | 2 | 2 | 2 | 2 | 2 |
| Ni dibutyl dithiocarbamate (age resistor) | 1 | 1 | 1 | 1 | 1 | 1 | 1 |
| Hydrotalcite 1 *5) | | | 3 | | | 7 | 3 |
| Hydrotalcite 2 *6) | | | | | | | |
| Hydrotalcite 3 *7) | | | | | | | |
| Slaked lime | 3 | 3 | | 3 | | | |
| Magnesia | | 2 | | | 3 | 3 | 3 |
| Mixture (1:2) of DBU *8) and phenol resin (accerelator) | 1 | | | | | | |
| N-Cyclohexylthiophthalimide (retarder) | 0.5 | 0.5 | 0.5 | 0.5 | 0.5 | 0.5 | 0.5 |
| Pyrazine-2,3-dithiocarbonate (vulcanizing agent) | | | | | | | |
| 5-Ethylpyrazine-2,3-dithiocarbonate (vulcanizing agent) | 1.5 | 1.5 | | | | | |
| Trithiocyanuric acid (vulcanizing agent) | | | 1 | 1 | 1 | 1 | 1 |

Note to Table 1
1*): Epichlomer H (a tradename) manufactured by Daiso Co. Ltd., $ML_{1+4}(100°$ C.) of 50
2*): Epichlomer CG-104 (a tradename) manufactured by Daiso Co. Ltd., an epichlorohydrin/ethylene oxide/allyl glycidyl ether (molar ratio 63/34.5/2.5) copolymer, $ML_{1+4}(100°$ C.) of 65
*3): Epichlomer C (a tradename) manufactured by Daiso Co. Ltd., an epichlorohydrin/ethylene oxide (molar ratio 50/50) copolymer, $ML_{1+4}(100°$ C.) of 65
*4): Carplex #1120 (a tradename) manufactured by Shionogi Pharmaceutical Co. Ltd.
*5) Hydrotalcite 1: $Mg_{4.5}Al_2(OH)_{13}CO_3 \cdot 3.5H_2O$
*6) Hydrotalcite 2: $Mg_{4.5}Al_2(OH)_{13}CO_3$
*7) Hydrotalcite 3: $Mg_6Al_2(OH)_{16}CO_3 \cdot 4H_2O$
*8) DBU: 1,8-diazabicyclo[5.4.0]undecene-7

TABLE 2

| Mooney Scorch test, L rotor at 125° C. | | | | | | |
|---|---|---|---|---|---|---|
| | Example No. | | | | | |
| | 1 | 2 | 3 | 4 | 5 | 6 |
| Immediately after the mixing | | | | | | |
| Vm (minimum viscosity) | 60 | 74 | 81 | 85 | 87 | 85 |
| $T_5$ [time (in minutes) required for increase of 5 points] | 11.3 | 10.5 | 8.1 | 6.9 | 5.7 | 5.0 |
| After 3 days at 35° C. and a relative humidity of 75% | | | | | | |
| Vm (minimum viscosity) | 61 | 74 | 82 | 94 | 90 | 92 |
| $T_5$ [time (in minutes) required for increase of 5 points] | 9.2 | 7.5 | 6.7 | 4.4 | 4.4 | 2.5 |

| | Comparative Example No. | | | | | | |
|---|---|---|---|---|---|---|---|
| | 1 | 2 | 3 | 4 | 5 | 6 | 7 |
| Immediately after the mixing | | | | | | | |
| Vm (minimum viscosity) | 85 | 90 | 85 | 95 | 90 | 86 | 94 |
| $T_5$ [time (in minutes) required for increase of 5 points] | 8.8 | 4.4 | 10.1 | 3.6 | 7.1 | 6.4 | 6.3 |
| After 3 days at 35° C. and a relative humidity of 75% | | | | | | | |
| Vm (minimum viscosity) | >200 | >200 | 87 | >200 | >200 | 120 | 165 |
| $T_5$ [time (in minutes) required | | | 2.7 | | | 2.7 | 2.5 |

TABLE 2-continued

Mooney Scorch test, L rotor at 125° C.

for increase of 5 points]

TABLE 3

| Vulcanization properties | Example No. | | | | | |
|---|---|---|---|---|---|---|
| | 1 | 2 | 3 | 4 | 5 | 6 |
| 100% Modulus (MPa) | 2.4 | 3.7 | 4.1 | 4.4 | 4.7 | 3.1 |
| Tensile strength (MPa) | 14.3 | 13.9 | 15.5 | 14.4 | 14.3 | 13.0 |
| Elongation at break (%) | 610 | 600 | 595 | 580 | 540 | 650 |
| Hardness (JISA) | 67 | 68 | 71 | 73 | 74 | 69 |

| Vulcanization properties | Comparative Example No. | | | | | | |
|---|---|---|---|---|---|---|---|
| | 1 | 2 | 3 | 4 | 5 | 6 | 7 |
| 100% Modulus (MPa) | 2.8 | 2.9 | 1.2 | 3.5 | 3.3 | 1.5 | 1.9 |
| Tensile strength (MPa) | 15.8 | 15.0 | 10.6 | 12.2 | 15.0 | 11.5 | 13.5 |
| Elongation at break (%) | 930 | 810 | 1115 | 605 | 820 | 1045 | 995 |
| Hardness (JISA) | 68 | 68 | 60 | 72 | 69 | 61 | 63 |

The above Table 2 shows that Examples according to the present invention have the remarkably improved storage stability in comparison with Comparative Examples 1 and 2 in which hydrotalcites are not mixed and Comparative Examples 4 and 5 in which hydrotalcites are not mixed and a vulcanizing agent different from that of the present invention is used. Comparative Examples 3, 6 and 7 use hydrotalcites and a vulcanizing agent different from that of the present invention, and have the remarkably low vulcanization rate as shown in FIGS. 1–3. Examples 7 to 12 and Comparative Examples 8 and 9

Figure 4:
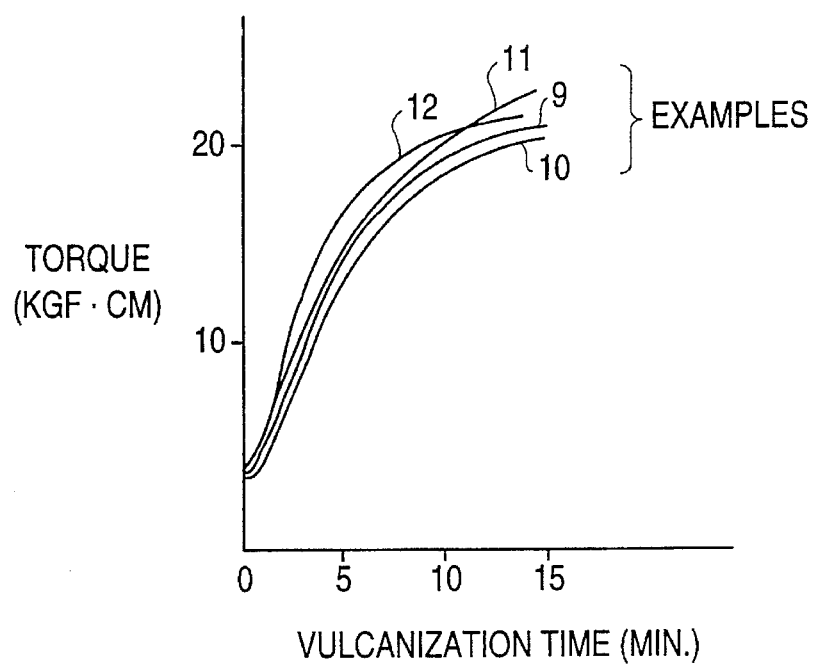
FIG. 4 shows vulcanization curves of compositions of Examples 9–12 immediately after mixing the ingredients.
Figure 5:
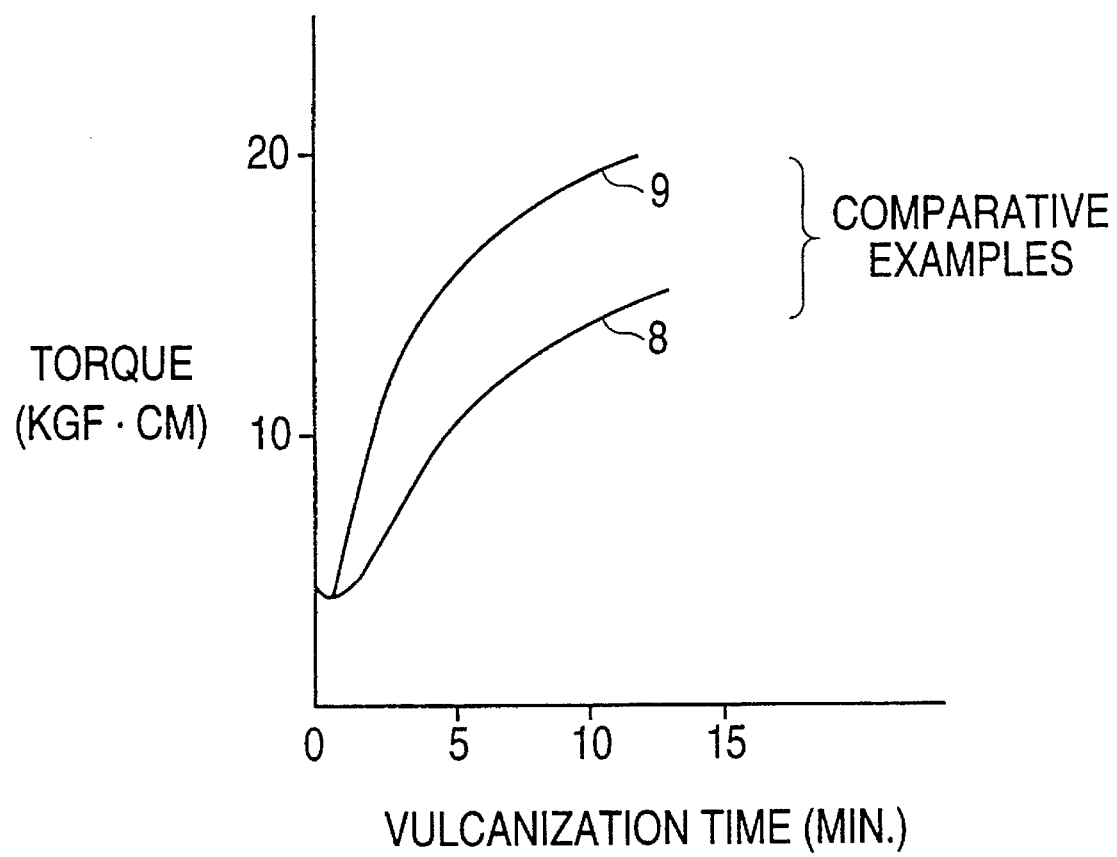
FIG. 5 shows vulcanization curves of compositions of Comparative Examples 8 and 9 immediately after mixing the ingredients.

The ingredients shown in Table 4 were kneaded in an open roll mill at 60° to 70° C. The storage stability of the composition is shown in Table 5. A composition sheet was placed in a mold immediately after mixing the ingredients, and then molded under pressure at 170° C. and 80 kg/cm² for 15 minutes. The vulcanizate obtained was tested for the various properties. The results are shown in Table 6. The vulcanization curves of the compositions obtained in Examples 9–12 and Comparative Examples 8 and 9 were determined immediately after mixing the ingredients by the use of JSR type III curelastometer at an angle of amplitude of 3° and a temperature of 170° C. The results are shown in FIGS. 4 and 5.

TABLE 4

| Ingredients | Example No. | | | | | |
|---|---|---|---|---|---|---|
| (parts by weight) | 7 | 8 | 9 | 10 | 11 | 12 |
| Epichlorohydrin homopolymer *1) | 100 | | | | | |
| ECH-EO-AGE copolymer *2) | | 100 | | | | |
| ECH-EO copolymer *3) | | | 100 | 100 | 100 | 100 |
| N-550 carbon black | 40 | 40 | 40 | 40 | 40 | 20 |
| White carbon *4) | | | | | | 20 |
| Sorbitan monostearate (lubricant) | 2 | 2 | 2 | 2 | 2 | 2 |
| Ni dibutyl dithiocarbamate (age resistor) | 1 | 1 | 1 | 1 | 1 | 1 |
| Hydrotalcite 1 *5) | | | 3 | 3 | 7 | 5 |
| Hydrotalcite 2 *6) | 3 | | | | | |
| Hydrotalcite 3 *7) | | 3 | | | | |
| Slaked lime | | | | 3 | 3 | |
| Magnesia | | | | | | |
| Mixture (1:2) of DBU *8) and phenol resin (accerelator) | 1 | 1 | 1 | 1 | 1 | |
| N-Cyclohexylthiophthalimide (retarder) | 0.5 | 0.5 | 0.5 | 0.5 | 0.5 | 0.5 |
| Quinoxaline-2,3-dithiocarbonate (vulcanizing agent) | 2 | 2 | | | | |
| 6-Methylquinoxaline-2,3-dithiocarbonate (vulcanizing agent) | | | 1.5 | 1.5 | 1.5 | 1.5 |
| Trithiocyanuric acid (vulcanizing agent) | | | | | | |

TABLE 4-continued

| Ingredients | Comparative Example No. | | | | | | |
|---|---|---|---|---|---|---|---|
| (parts by weight) | 8 | 9 | 3 | 4 | 5 | 6 | 7 |
| Epichlorohydrin homopolymer *1) | | | | | | | |
| ECH-EO-AGE copolymer *2) | | | | | | | |
| ECH-EO copolymer *3) | 100 | 100 | 100 | 100 | 100 | 100 | 100 |
| N-550 carbon black | 40 | 20 | 40 | 40 | 40 | 40 | 40 |
| White carbon *4) | | 20 | | | | | |
| Sorbitan monostearate (lubricant) | 2 | 2 | 2 | 2 | 2 | 2 | 2 |
| Ni dibutyl dithiocarbamate (age resistor) | 1 | 1 | 1 | 1 | 1 | 1 | 1 |
| Hydrotalcite 1 *5) | | | 3 | | | 7 | 3 |
| Hydrotalcite 2 *6) | | | | | | | |
| Hydrotalcite 3 *7) | | | | | | | |
| Slaked lime | 3 | 3 | | 3 | | | |
| Magnesia | | 2 | | | 3 | 3 | 3 |
| Mixture (1:2) of DBU *8) and phenol resin (accerelator) | 1 | | | | | | |
| N-Cyclohexylthiophthalimide (retarder) | 0.5 | 0.5 | 0.5 | 0.5 | 0.5 | 0.5 | 0.5 |
| Quinoxaline-2,3-dithiocarbonate (vulcanizing agent) | | | | | | | |
| 6-Methylquinoxaline-2,3-dithiocarbonate (vulcanizing agent) | 1.5 | 1.5 | | | | | |
| Trithiocyanuric acid (vulcanizing agent) | | | 1 | 1 | 1 | 1 | 1 |

Note to Table 4
*1): Epichlomer H (a tradename) manufactured by Daiso Co. Ltd., $ML_{1+4}(100°\,C.)$ of 50
*2): Epichlomer CG-104 (a tradename) manufactured by Daiso Co. Ltd., an epichlorohydrin/ethylene oxide/allyl glycidyl ether (molar ratio 63/34.5/2.5) copolymer, $ML_{1+4}(100°\,C.)$ of 65
*3): Epichlomer C (a tradename) manufactured by Daiso Co. Ltd., an epichlorohydrin/ethylene oxide (molar ratio 50/50) copolymer, $ML_{1+4}(100°\,C.)$ of 65
*4): Carplex #1120 (a tradename) manufactured by Shionogi Pharmaceutical Co. Ltd.
*5) Hydrotalcite 1: $Mg_{4.5}Al_2(OH)_{13}CO_3.3.5H_2O$
*6) Hydrotalcite 2: $Mg_{4.5}Al_2(OH)_{13}CO_3$
*7) Hydrotalcite 3: $Mg_6Al_2(OH)_{16}CO_3.4H_2O$
*8) DBU: 1,8-diazabicyclo[5.4.0]undecene-7

TABLE 5

Mooney Scorch test, L rotor at 125° C.

| | Example No. | | | | | |
|---|---|---|---|---|---|---|
| | 7 | 8 | 9 | 10 | 11 | 12 |
| Immediately after the mixing | | | | | | |
| Vm (minimum viscosity) | 58 | 71 | 80 | 87 | 86 | 82 |
| $T_5$ [time (in minutes) required for increase of 5 points] | 10.2 | 9.0 | 7.9 | 6.4 | 5.7 | 5.4 |
| After 3 days at 35° C. and a relative humidity of 75% | | | | | | |
| Vm (minimum viscosity) | 60 | 71 | 79 | 98 | 89 | 88 |
| $T_5$ [time (in minutes) required for increase of 5 points] | 7.4 | 6.7 | 6.4 | 4.3 | 3.7 | 2.8 |

| | Comparative Example No. | | | | | | |
|---|---|---|---|---|---|---|---|
| | 8 | 9 | 3 | 4 | 5 | 6 | 7 |
| Immediately after the mixing | | | | | | | |
| Vm (minimum viscosity) | 85 | 90 | 85 | 95 | 90 | 86 | 94 |
| $T_5$ [time (in minutes) required for increase of 5 points] | 9.5 | 4.5 | 10.1 | 3.6 | 7.1 | 6.4 | 6.3 |
| After 3 days at 35° C. and a relative humidity of 75% | | | | | | | |
| Vm (minimum viscosity) | >200 | >200 | 87 | >200 | >200 | 120 | 165 |
| $T_5$ [time (in minutes) required for increase of 5 points] | | | 2.7 | | | 2.7 | 2.5 |

TABLE 6

| Vulcanization properties | Example No. | | | | | |
|---|---|---|---|---|---|---|
| | 7 | 8 | 9 | 10 | 11 | 12 |
| 100% Modulus (Mpa) | 2.3 | 3.4 | 3.5 | 3.8 | 4.1 | 2.9 |
| Tensile strength (MPa) | 14.7 | 14.0 | 15.3 | 14.6 | 14.2 | 12.3 |
| Elongation at break (%) | 650 | 630 | 655 | 610 | 555 | 655 |
| Hardness (JISA) | 66 | 67 | 69 | 72 | 73 | 69 |
| Vulcanization properties | Comparative Example No. | | | | | | |
| | 8 | 9 | 3 | 4 | 5 | 6 | 7 |
| 100% Modulus (Mpa) | 2.6 | 2.8 | 1.2 | 3.5 | 3.3 | 1.5 | 1.9 |
| Tensile strength (MPa) | 15.9 | 15.2 | 10.6 | 12.2 | 15.0 | 11.5 | 13.5 |
| Elongation at break (%) | 940 | 820 | 1115 | 605 | 820 | 1045 | 995 |
| Hardness (JISA) | 67 | 68 | 60 | 72 | 69 | 61 | 63 |

The above Table 5 shows that Examples according to the present invention have the remarkably improved storage stability in comparison with Comparative Examples 8 and 9 in which hydrotalcites are not mixed and Comparative Examples 4 and 5 in which hydrotalcites are not mixed and a vulcanizing agent different from that of the present invention is used. Comparative Examples 3, 6 and 7 use hydrotalcites and a vulcanizing agent different from that of the present invention, and have the remarkably low vulcanization rate as shown in FIGS. 3–5.

Effect of the Invention

The present invention provides the curable epichlorohydrin polymer composition having the high curing speed and the excellent storage stability for a long time.

What is claimed is:

1. A vulcanizable composition comprising (a) 100 parts by weight of an epichlorohydrin polymer;

(b) 0.1 to 10 parts by weight of a 2,3-dimercaptopyrazine derivative of the formula:

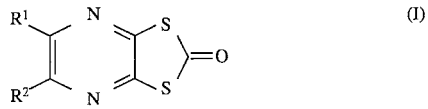 (I)

or, a 2,3-dimercaptoquinoxaline derivative of the formula:

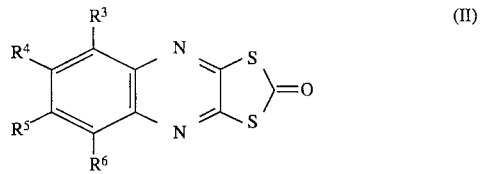 (II)

wherein $R^1$, $R^2$, $R^3$, $R^4$, $R^5$ and $R^6$ are the same or different, each is a hydrogen atom or an alkyl group containing 1 to 4 carbon atoms; and (c) 1 to 10 parts by weight of a hydrotalcite compound.

2. The vulcanizable composition according to claim 1, wherein the 2,3-dimercaptopyrazine derivative is at least one selected from the group consisting of pyrazine-2,3-dithiocarbonate, 5-ethylpyrazine- 2,3-dithiocarbonate, 5,6-dimethylpyrazine-2,3-dithiocarbonate and 5-n-butylpyrazine-2,3-dithiocarbonate.

3. The vulcanizable composition according to claim 1, wherein the 2,3-dimercaptoquinoxaline derivative is at least one selected from the group consisting of quinoxaline-2,3-dithiocarbonate, -methylquinoxaline-2,3-dithiocarbonate, 6-isopropylquinoxaline-2,3-dithiocarbonate and 5,8-dimethylquinoxaline-2,3-dithiocarbonate.

4. The vulcanizable composition according to claim 1, wherein the hydrotalcite compound (c) is of the formula:

$$Mg_xAl_y(OH)_{2x+3y-2}CO_3 \cdot wH_2O \qquad (III)$$

wherein x is from 1 to 10, y is from 1 to 5, and w is a real number.

5. A vulcanizable composition according to claim 1, wherein the epichlorohydrin polymer has a Mooney viscosity of 30 to 150.

6. A vulcanizable composition according to claim 1, wherein component (b) comprises a 2,3-dimercaptopyrazine derivative of the formula (I).

7. A vulcanizable composition according to claim 6, wherein component (b) comprises pyrazine-2,3-dithiocarbonate or 5-ethylpyrazine-2,3-dithiocarbonate.

8. A vulcanizable composition according to claim 1, wherein component (b) comprises a 2,3-dimercaptoquinoxaline derivative of the formula (II).

9. A vulcanizable composition according to claim 8, wherein component (b) comprises quinoxaline-2,3-dithiocarbonate or 6-methylquinoxaline-2,3-dithiocarbonate.

10. A vulcanizable composition according to claim 1, which comprises 0.5 to 5 parts by weight of component (b).

11. A vulcanizable composition according to claim 1, which comprises 2 to 8 parts by weight of component (c).

12. A vulcanizable composition according to claim 1, which further comprises metal compound as an acid acceptor.

13. A vulcanizable composition according to claim 12, which comprises 0.1 to 20 parts by weight of the metal compound.

14. A vulcanizable composition according to claim 1, which further comprises 0.1 to 10 parts by weight of a vulcanization accelerator.

15. A vulcanizable composition according to claim 1, which further comprises 0.1 to 10 parts by weight of a vulcanization retarder.

16. A composition according to claim 1, which is vulcanized.

17. A composition according to claim 16, which is vulcanized by heating at from 100° to 200° C. for from 0.5 to 300 minutes.

* * * * *